(12) United States Patent
Callewaert et al.

(10) Patent No.: US 11,580,065 B1
(45) Date of Patent: Feb. 14, 2023

(54) AUTOMATED ORCHESTRATION OF CYBER PROTECTION OF A SET OF STORAGE VOLUMES

(71) Applicant: Dell Products, L.P., Hopkinton, MA (US)

(72) Inventors: Peter Callewaert, Puurs-Sint-Amands (BE); Dennis Trulli, Hudson, MA (US); Brett Quinn, Cotuit, MA (US); John Darling, McKinney, TX (US)

(73) Assignee: Dell Products, L.P., Hopkinton, MA (US)

(*) Notice: Subject to any disclaimer, the term of this patent is extended or adjusted under 35 U.S.C. 154(b) by 0 days.

(21) Appl. No.: 17/577,464

(22) Filed: Jan. 18, 2022

(51) Int. Cl.
| | |
|---|---|
| *G06F 16/20* | (2019.01) |
| *G06F 16/11* | (2019.01) |
| *G06F 16/178* | (2019.01) |
| *G06F 16/182* | (2019.01) |
| *G06F 11/14* | (2006.01) |

(52) U.S. Cl.
CPC ........ *G06F 16/128* (2019.01); *G06F 11/1451* (2013.01); *G06F 16/122* (2019.01); *G06F 16/178* (2019.01); *G06F 16/1844* (2019.01)

(58) Field of Classification Search
None
See application file for complete search history.

(56) References Cited

U.S. PATENT DOCUMENTS

| | | | | |
|---|---|---|---|---|
| 9,413,852 B2 * | 8/2016 | Lawson | .................... | G06F 1/14 |
| 2002/0069076 A1 * | 6/2002 | Faris | ...................... | H04L 63/12 |
| | | | | 342/357.4 |

* cited by examiner

*Primary Examiner* — Belix M Ortiz Ditren
(74) *Attorney, Agent, or Firm* — Anderson Gorecki LLP

(57) ABSTRACT

An Orchestrated Data Recovery (ODR) Cyber Protection Automation (CPA) operates to ensure one-to-one creation of snapsets of a production site and corresponding snapsets of a cyber vault. During an initiation phase, the ODR CPA monitors synchronization of a snapset of production volumes from the production site to the cyber vault. If additional snapsets of the production volumes are created prior to completion of synchronization of the first snapset, the additional snapsets are also synchronized to the cyber vault. Once the initial synchronization of the storage volumes has been completed, the ODR CPA causes a Storage Volume Creation and Management System (SVCMS) to create a snapset of the storage volumes at the cyber vault. Subsequently, each time a snapset is created of the production site, the ODR CPA orchestrates synchronization of the snapset to the cyber vault and creation of a corresponding snapset at the cyber vault.

11 Claims, 15 Drawing Sheets

Type 1 - Initialization Mode

Type 1 - Initialization Mode

Type 1 - Differential Mode

Type 2 - Initialization Mode

Type 2 - Initialization Mode

Type 2 - Differential Mode

Type 2 - Differential Mode

Type 2 - Differential Mode

Type 3 - Initialization Mode

Type 3 - Initialization Mode

Type 3 - Differential Mode

Type 3 - Differential Mode

AUTOMATED ORCHESTRATION OF CYBER PROTECTION OF A SET OF STORAGE VOLUMES

FIELD

This disclosure relates to computing systems and related devices and methods, and, more particularly, to a method and apparatus automated orchestration of cyber protection for a set of storage volumes.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, an Orchestrated Data Recovery (ODR) Cyber Protection Automation (CPA) operates to ensure one-to-one creation of snapsets on a production site and corresponding snapsets on a cyber vault. During an initiation phase, the ODR CPA monitors synchronization of a snapset of production volumes from the production site to the cyber vault. If additional snapsets of the production volumes are created prior to completion of synchronization of the first snapset, the additional snapsets are also synchronized to the cyber vault. Once the initial synchronization of the storage volumes has been completed, the ODR CPA causes a Storage Volume Creation and Management System (SVCMS) to create a snapset of the storage volumes at the cyber vault. Subsequently, each time a snapset is created at the production site, the ODR CPA orchestrates synchronization of the snapset to the cyber vault and creation of a corresponding snapset at the cyber vault. Creation of a snapset at the production site can be implemented autonomously by the SVCMS, in response to detection by the ODR CPA of closing of an air gap between the production site and cyber vault, or in response to detection of occurrence of an ODR CPA trigger event.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
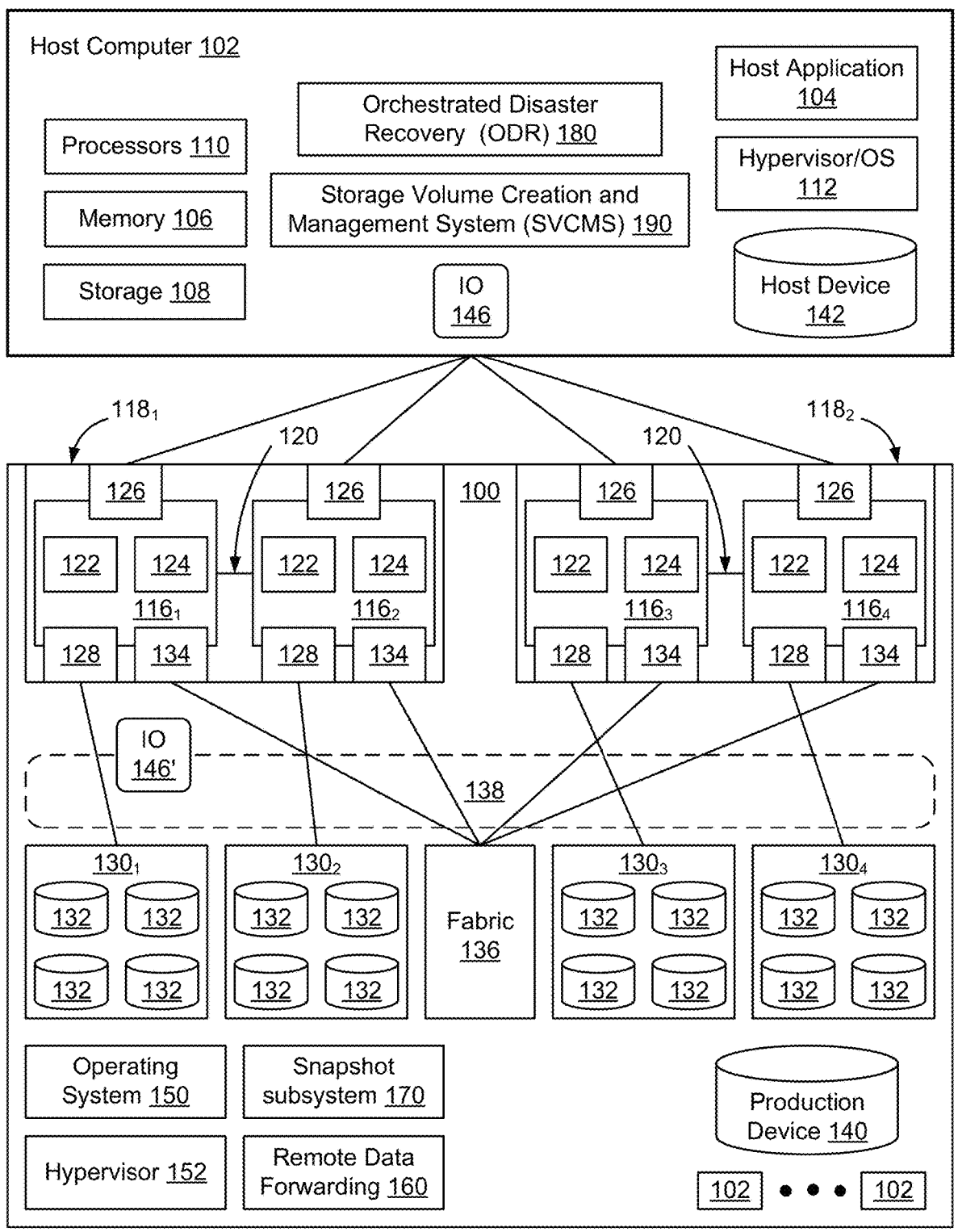
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. In some implementations, from the perspective of the host application 104, the host device 142 is a single data storage device having a set of contiguous fixed-size LBAs (Logical Block Addresses) on which data used by the host application 104 resides and can be stored. In other implementations, such as in a mainframe CKD implementation, the host does not use contiguous fixed size LBAs. The data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data at the production device 140 to a location to which the block is written on the managed drives 132.

Hosts 102, such as mainframe (zOS) computer systems, store data using storage resources of the storage systems 100. Software, such as an Orchestrated Disaster Recovery (ODR) application 180 is used to automate, react, and monitor large scale mainframe and mixed mainframe-open systems environments, to provide continuous operations or automated failover during planned or unplanned events. One example commercially available ODR application 180 is referred to as Geographically Dispersed Disaster Recovery (GDDR) which is available from Dell™, although the techniques described herein can be used in connection with other forms of ODR applications 180. Although some embodiments will be described using ODR application 180 as an example software implementation, it should be understood that the techniques described herein for automated orchestration of cyber protection can be used in other environments as well.

In some embodiments, ODR application 180 is a mainframe software product that automates business recovery procedures by reacting to events that its monitoring capability detects in a data center. Because the ODR application 180 is designed to provide system restart following disasters, ODR application 180 does not reside in the same systems that it is seeking to protect. Rather, ODR application 180 resides on separate logical partitions from those that run application workloads.

Figure 2:
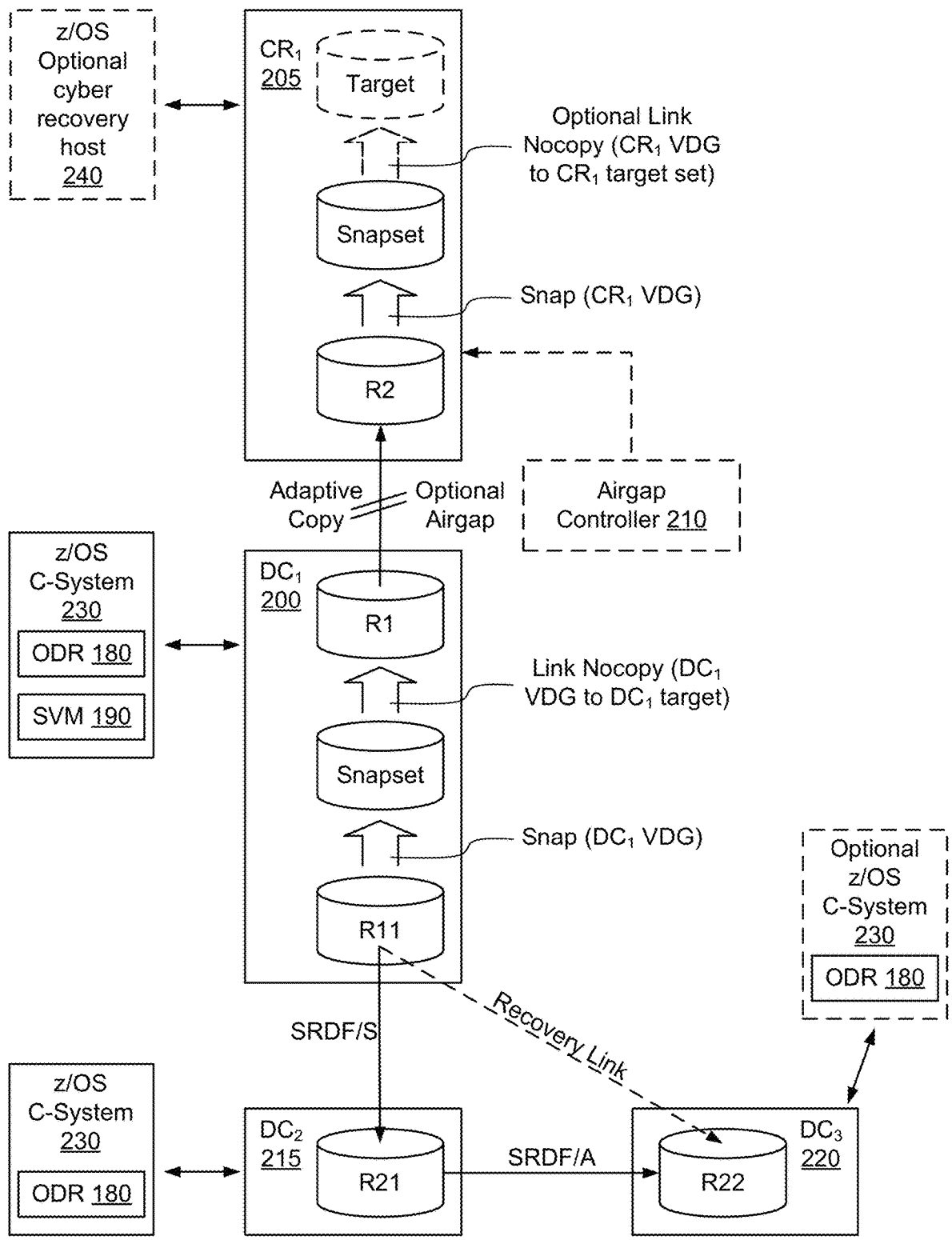
FIG. 2 is a functional block diagram of a storage environment configured to provide Orchestrated Disaster Recovery (ODR) Cyber Protection Automation (CPA), according to some embodiments.

ODR application 180 works in connection with remote data forwarding subsystem 160 of storage system 100 to create replication facilities between pairs of similarly configured storage systems 100. For example, as shown in FIG. 2, a replication facility R11-R21 may be created such that data contained in the R11 volume on a first storage system $DC_1$ 200 will be replicated by the first storage system to the R21 volume on the second storage system $DC_2$ 215. Replication of data on a replication facility will be referred to herein as remote data forwarding (RDF).

As shown in FIG. 1, in some embodiments storage system 100 has a snapshot subsystem configured to create point in time copies of storage volumes. A snapshot of a storage volume, such as production device 140, is point-in-time copy of the storage volume at the storage volume existed at the time that the snapshot was created.

In some embodiments, host computer runs a mainframe software application configured to manage creation and management of storage volumes and to interact with the storage systems 100 that are providing storage resources to the host computer 102 to ensure that the storage systems 100 are correctly configured to provide continuous data protection for mainframe data assets. For example, as shown in FIG., 1, in some embodiments the host computer includes Storage Volume Creation and Management System (SVCMS) 190 that is configured to interact with storage system 100 to cause the snapshot subsystem 170 of storage system 100 to create snapshots of storage volumes used by host computer 102 on a regular cadence.

In some embodiments, SVCMS interacts with the storage system 100 to create a versioned data group on the storage system 100 containing a set of storage volumes that are to be backed up. SVCMS 190 also interacts with the snapshot subsystem 170 of the storage system 100 to cause the snapshot subsystem 170 to create snapsets (groups of snapshots) of the storage volumes of the versioned data group. In this way, the mainframe host 102 can control creation of snapsets of volumes of data by the snapshot subsystem 170 of the storage system 100.

FIG. 2 is a functional block diagram of an example storage environment which includes a cascaded triangular-shaped data replication facility including production sites $DC_1$ 200, $DC_2$ 215, and $DC_3$ 220. As shown in FIG. 2, the triangular-shaped data replication facility has a first replication facility from R11 volume on $DC_1$ to R21 volume on $DC_2$, and a second replication facility from R21 volume on $DC_2$ to R22 volume on $DC_3$. In some embodiments, orchestrated disaster recovery application 180 is used to configure the triangular-shaped data replication facility to enable data to be mirrored between storage systems $DC_1$ 200, $DC_2$ 215, and $DC_3$ 220 so that, in the event of a failure of one of the storage systems $DC_1$ 200, $DC_2$ 215, or $DC_3$ 220, the data remains available on one or more of the other storage systems. In the event of a failure, the orchestrated disaster recovery application 180 on each of the zOS computer systems 230 enables failover from one storage system to another of the storage systems of the data replication facility. Although FIG. 2 shows a triangular-shaped data replication facility, it should be understood that data replication facilities can have different numbers of storage systems and different architectures depending on the implementation.

In FIG. 2, a Cyber Recovery (CR) vault site $CR_1$ 205 is connected by a replication facility R1-R2 with one of the production sites DCx 200, which is the source of production data that is to be protected using the cyber recovery vault CRy 205. In FIG. 2, production site $DC_1$ is connected to a cyber recovery vault $CR_1$, although cyber recovery vault $CR_1$ 205 may be connected to any production site DCx 200. In some embodiments, Cyber Protection Automation (CPA) is implemented using ODR CPA 180, to create copies of data at a cyber recovery vault (CRV) site CRy 205 that can be used for cyber recovery, for example in instances where the data maintained by the storage systems implementing the data replication facility is corrupted in a malware attack. In some embodiments, the SVCMS 190 is used to cyclically create regular snapsets, which are then replicated by the ODR CPA 180 to a physically separate, possibly air gapped, cyber recovery vault $CR_1$ 205 using a Cyber Protection Automation (CPA) process.

An air gap, as that term is used herein, refers to the relative isolation of the storage system $CR_1$ implementing the cyber recovery vault CRy 205 from the production site DCx 200. As shown in FIG. 2, in some embodiments the production site DCx 200 and cyber recovery vault CRy 205 are connected by RDF links 250. In an air gapped solution, these RDF links 250 are normally offline, making data flow impossible. When an air gap connection is enabled, that means that data flow is possible and the RDF links are ONLINE. When an air gap connection is disabled, that means data flow is not possible because the RDF links are OFFLINE.

In some embodiments, there is no channel attachment from production site DCx 200 hosts to the cyber recovery vault CRy 205 air gap controllers 210. The status of the RDF links is controlled by changing RDF ports status (ONLINE/OFFLINE) at the cyber recovery vault CRy 205 air gap controllers 210. To change the status of an air gap to enabled, the RDF port status is changed at the cyber recovery vault CRy 205 air gap controllers 210. For example, one or more system servers installed at the cyber recovery vault CRy 205 will be responsible for bringing the cyber recovery vault CRy 205 RDF ports online, thus enabling the air gap connection. For example, as shown in FIG. 2, an air gap controller 210 is used in some embodiments to enable the air gap at cyber recovery vault CRy 205, which prevents an attacker from closing the air gap from production site DCx 200. Once the air gap is enabled, the ODR CPA 180 system at the production site can issue a command to the air gap controller 210 over the RDF links to cause the air gap controller 210 to close the RDF links by turning the cyber recovery vault CRy 205 RDF ports offline.

As shown in FIG. 2, the cyber recovery vault CRy 205 is linked to the production site DCx 200 by one or more RDF groups configured with Adaptive Copy Disk devices R1 at production site DCx 200 and R2 at cyber recovery vault CRy 205. It should be noted that use of a cyber recovery vault CRy 205 does not require use of an air gap, as the use of an air gap is optional depending on the implementation.

ODR CPA 180 orchestrates the creation and transmission of snapsets 310 of storage volumes 305 in a Versioned Data Group (VDG) 315 from a cyber recovery data source site DCx 200 to a physically separate cyber recovery vault CRy 205. ODR CPA 180 also automatically orchestrates the creation of corresponding snapsets 335 of a versioned data group 320 at the cyber recovery vault CRy 205. In the case of a cyber-attack, the user can then perform cyber recovery using the snapsets 335 in the cyber recovery vault CRy 205. Cyber Protection Automation (CPA) can be implemented in any ODR CPA 180 configuration and at any site in those configurations. Accordingly, the environment shown in FIG. 2 is intended to merely illustrate one possible implementation of cyber protection automation using a cyber recovery vault CRy 205.

The cyber recovery data source site, referred to herein as the production site DCx 200, can be any ODR CPA 180 managed site DCx. This is the source of the data requiring cyber protection. It can be any site in any 2-site, 3-site or 4-site ODR CPA 180 configuration: DC1, DC2, DC3 or DC4. This site is also sometimes referred to as the "LOCAL" site, or Production site.

The cyber recovery vault site 205 is the site where the cyber protection copy will be stored. Any cyber recovery vault CRy 205 can be paired with any production site DCx 200 in a one-to-one manner. In some embodiments, the CRy is at unknown distance from production site DCx 200, and ODR CPA 180 is unaware of the physical reality involved. It is therefore perfectly possible that CRy is in the same room as production site DCx 200, or it could be on the opposite side of the planet. It is also architecturally allowed that the physical arrays taking on the role of CRy arrays are in fact regular ODR CPA 180 managed arrays at any production site DCx 200 in the ODR CPA 180 configuration.

In some embodiments, only one cyber recovery vault CRy 205 is allowed per production site DCx 200 in the ODR CPA 180 configuration.

In some embodiments, the ODR CPA 180 Actions are performed using a repetitive sequence as described below. All these actions are initiated by ODR CPA 180, with 2 exceptions: (1) the creation of SVCMS 190 snapsets of production site DCx 200 is initiated by SVCMS 190 in Type 1 implementations; and (2) the enabling of the air gap connection in Type 2 implementations is done by the air gap controller 210. Specifically, in some embodiments, the ODR CPA 180 implements an action cycle including the following functions:

(1) ODR CPA 180 creates a consistent SVCMS 190 snapset 310 of ODR CPA 180 managed devices 305 on production site DCx 200, either autonomously by SVCMS 190, or controlled by ODR CPA 180 for example by having the ODR CPA 180 issue SVCMS 190 RESUME and PAUSE commands to SVCMS 190.

(2) ODR CPA 180 links the SVCMS 190 snapset 310 in mode NOCOPY to a production site DCx 200 TARGET_SET comprising the production site DCx 200 R1 325 adaptive copy devices. This creates invalid tracks owed to cyber recovery vault CRy 205;

(3) ODR CPA 180 synchronizes all invalid tracks from production site DCx 200 to cyber recovery vault CRy 205 in adaptive copy mode. In some embodiments, in connection with synchronizing all invalid tracks from the production site DCx 200 to the cyber recovery vault CRy 205, ODR CPA 180 monitors that the invalid tracks in R1 325 go down to zero;

(4) ODR CPA 180 creates a SVCMS 190 snapset 335 of the cyber recovery vault CRy 205 R2 devices 330, for example using SVCMS 190 RESUME and PAUSE commands. The cyber recovery vault CRy 205 snapset 335 collection may have a mix of regular and secure snapsets, with a time to live as desired by the customer.

(5) ODR CPA 180 optionally links this cyber recovery vault CRy 205 snapset 335 to a cyber recovery vault CRy 205 TARGET_SET 340.

(6) The ODR CPA 180 action cycle then returns to step (1). In some embodiments, after initialization of cyber protection, the ODR CPA 180 action cycle implements a one-for-one rule, which requires that one cyber recovery vault CRy 205 snapset 335 is created for every production site DCx 200 snapset 310.

In some embodiments, there are three ODR CPA 180 implementation types, which are discussed in greater detail below. In type 1, the ODR CPA 180 action cycle is triggered by the detection (by ODR CPA 180) of a new production site DCx 200 snapset created by SVCMS 190. Although the ODR CPA 180 action cycle is triggered by autonomous creation by SVCMS 190 of the new production site DCx 200 snapshot, creation of the CRy SVCMS 190 snapset 335 at the cyber recovery vault CRy 205 is controlled by ODR CPA 180 during the CPA action cycle. Type 1 offers the advantage that snapset 310 creation continues even if ODR CPA 180 is stopped temporarily.

In type 2, the ODR CPA 180 action cycle is triggered by the detection (by ODR CPA 180) of enabling of the air gap connection by the airgap controller 210 at the cyber recovery vault CRy 205. As noted above, the air gap controller 210 at the cyber recovery vault CRy 205 is responsible for enabling the air gap, and the air gap cannot be enabled by ORD 180 CPA. In type 2, whenever the air gap is enabled to bring he RDF links 250 online, the ODR CPA 180 action cycle is triggered, in which ODR CPA 180 causes SVCMS 190 to create a production site DCx 200 snapset 310, that is then synchronized to cyber recovery vault CRy 205, after which ODR CPA 180 causes SVCMS 190 to create a cyber recovery vault CRy 205 snapset 335 and closes the air gap. In some embodiments, ODR CPA 180 is configured to close the air gap by issuing a command to the air gap controller 210 to instruct the air gap controller 210 to disable the RDF links on the storage system 100 implementing the cyber recovery vault CRy 205.

In type 3, the ODR CPA 180 action cycle is triggered in ODR CPA 180 by occurrence of an ODR CPA 180 event such as on a schedule or interval. When the ODR CPA 180 action cycle is triggered, ODR CPA 180 causes SVCMS190 to create a production site DCx 200 snapset 310, that is then synchronized to cyber recovery vault CRy 205, after which ODR CPA 180 causes SVCMS 190 to create a cyber recovery vault CRy 205 snapset 335.

As noted earlier, per the "One for One" rule, every snapset 310 created at production site DCx 200 should have a corresponding snapset 335 created at the cyber recovery vault CRy 205. This is a solution requirement, and a natural result of the ODR CPA 180 action cycle described herein. However, the first synchronization from production site DCx 200 to cyber recovery vault CRy 205 will be a full push of all data contained in the versioned data group $VDG_1$ 315, and this can take considerable time, possibly longer than the amount of time between creation of snapsets 310 on production site DCx 200. In some embodiments, ODR CPA 180 recognizes this situation, and until this first synchronization is complete, executes in what is referred to herein as "initialization mode", during this initial synchronization process. During initialization mode, the one-for-one rule is not implemented to prevent creation of a non-consistent non-restartable images of data at the cyber recovery vault CRy 205.

During the initialization mode of operation, several and possibly dozens of new snapsets 310 could be created at production site DCx 200. Whether and when new production site DCx 200 snapsets 310 are created depends on the implementation type. In Type 1, production site DCx 200 snapset creation occurs under control of SVCMS 190, based on the CYCLE_TIME specified for the production site DCx 200 VDG by the user. The user can also PAUSE creation of snapsets 310 at the production site DCx 200 VDG at any time. In Type 2 and Type 3, ODR CPA 180 drives the creation of production site DCx 200 snapsets, based on the specified interval or on a particular schedule.

In some embodiments, while operating in Initialization mode, ODR CPA 180 will LINK any additional production site DCx 200 snapsets to production site DCx 200 R1 325, adding incremental new invalid tracks to be synched to cyber recovery vault CRy 205, without creation of corresponding cyber recovery vault CRy 205 snapsets 330. Cyber recovery vault CRy 205 snapset 330 creation at this point would result in non-consistent non-restartable images of the data. When the initial synchronization has completed, ODR CPA 180 automatically switches into differential mode. Although initialization mode is described as being used primarily in connection with initial synchronization of the first snapshot 310 of the production volume 305 from the production site DCx 200 to the cyber vault CRy 205, it should be understood that other error and fault conditions can cause the ODR CPA 180 to revert back to the initialization mode of operation from differential mode of operation.

After ODR CPA 180 completes execution of the initialization mode of operation, the ODR CPA 180 enters into differential mode of operation. When operating in differential mode, each snapset 310 created at production site DCx 200 is synchronized to cyber recovery vault CRy 205 and have a corresponding snapset created (and optionally linked), at cyber recovery vault CRy 205. The solution now starts obeying the One for One rule. If any error occurs that causes PDR 180 CPA to violate the one-for-one rule, ODR CPA 180 will automtatically switch back to initialization mode.

Figure 3:
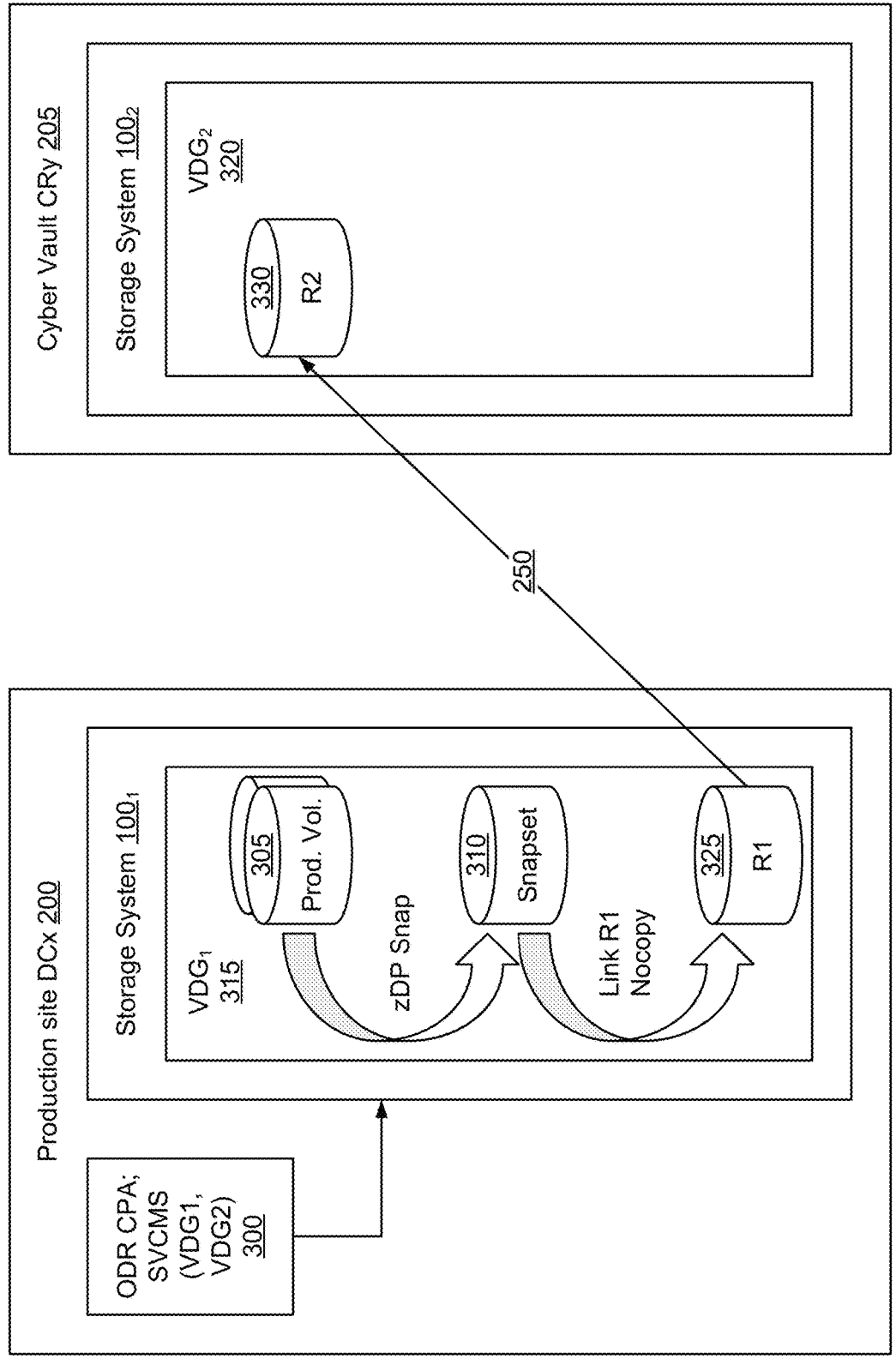
FIG. 3 is a functional block diagram showing initialization mode of operation of the ODR CPA, when the ODR CPA is operating using type 1 operation, in which the ODR CPA action cycle is triggered by creation of a production site DCx snapset by a Storage Volume Creation and Management System (SVCMS).
Figure 4:
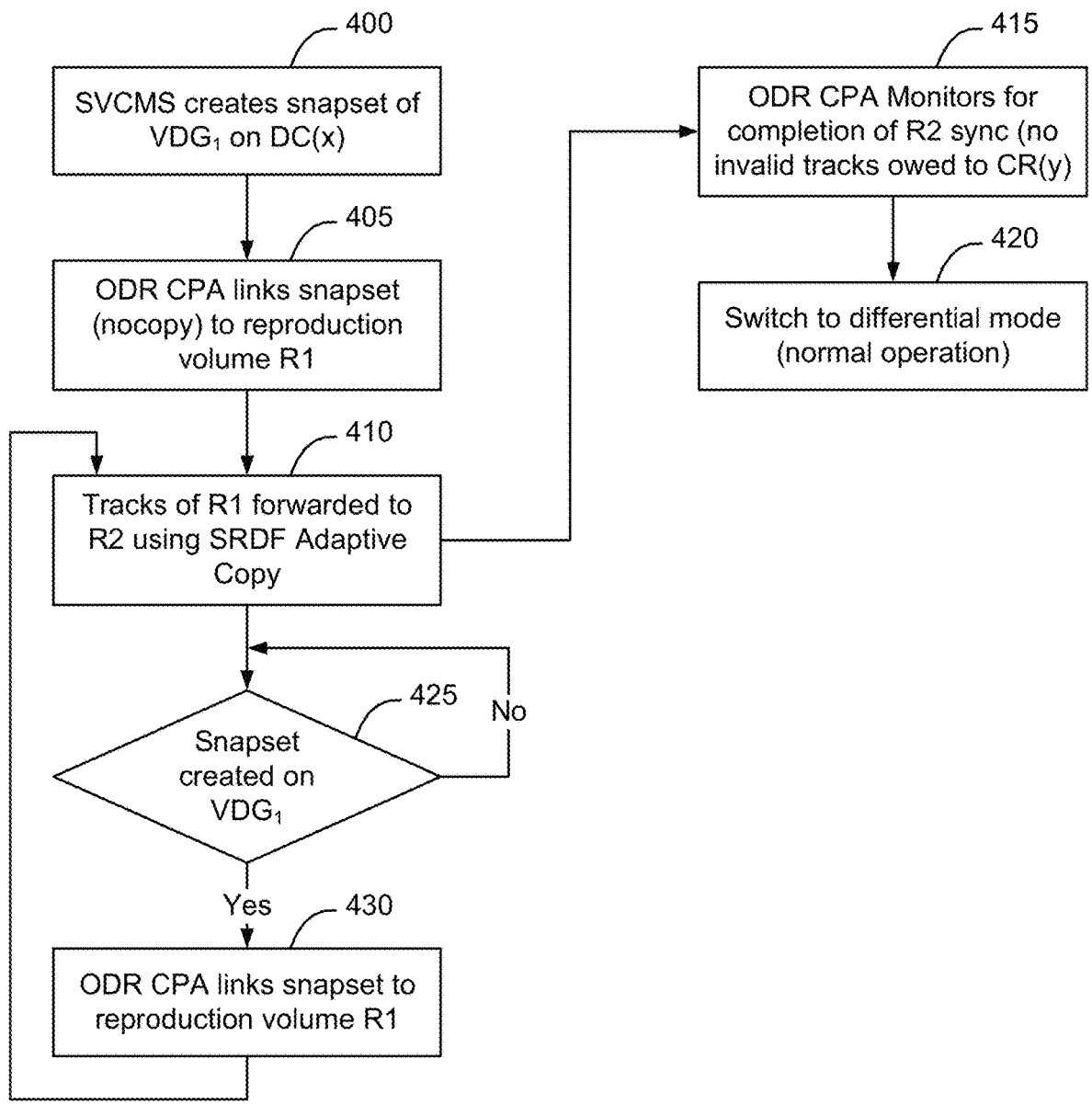
FIG. 4 is a flow chart corresponding to FIG. 3, and shows a method implemented by the ODR CPA during type 1 initialization mode of operation.

FIG. 3 is a functional block diagram showing initialization mode of operation of the ODR CPA 180, when the ODR CPA 180 is operating using type 1 operation, in which the ODR CPA 180 action cycle is triggered by creation of a production site DCx 200 snapset 310 of a set of production volumes 305 by SVCMS 190. Specifically, in type 1 operation, SVCMS 190 is operating autonomously to create snapsets 310 of production volumes 305 of $VDG_1$ 315. The first time a snapset 310 is created by SVCMS 190, ODR CPA 180 enters into initialization mode shown in FIG. 3. FIG. 4 is a corresponding flow chart of a method implemented by the ODR CPA 180 during the initialization mode of operation.

In FIG. 3, ODR CPA 180 and SVCMS 190 are running on a server 300 connected to the storage system 100 implementing the production site DCx 200. Two SVCMS 190 Versioned Data Groups (VDGs) have been defined—a first SVCMS 190 $VDG_1$ 315 at the production site DCx 200 and a second SVCMS 190 $VDG_2$ 320 at the cyber recovery vault CRy 205. In some embodiments, the cyber recover vault CRy 205 $VDG_2$ START and $VDG_2$ PAUSE commands are issued prior to ODR CPA 180 initialization. Each VDG 315, 320 has its own MAX_SNAPSETS value. In type 1, the SVCMS 190 is configured to autonomously create snapsets 310 of production volumes 305 in production site DCx 200 $VDG_1$ 315. However, in all execution types ODR CPA 180 controls creation of corresponding snapsets 335 by issuing instructions to SVCMS 190 to cause SVCMS 190 to create corresponding snapsets 335 at the cyber recovery vault CRy 205 $VDG_2$ 320, for example using SVCMS 190 PAUSE and RESUME instructions.

As shown in FIGS. 3 and 4, during the initialization mode of operation (Type 1), SVCMS 190 creates a snapset 310 of all production volumes 305 in $VDG_1$ 315 on production site DCx 200 (Block 400). Since this is the first snapset 310, the snapset 310 will be a snapset 310 of the full production volumes 305 contained in the $VDG_1$ 315. In response to creation of the snapset 310 by SVCMS 190, ODR CPA 180 links the snapset 310 to reproduction volume R1 325 in nocopy mode (Block 405). Storage system 1 then transmits tracks of reproduction volume R1 325 to reproduction volume R2 330 using RDF adaptive copy (Block 410). ODR CPA 180 monitors for completion of reproduction volume R2 330 synchronization, meaning that there are no invalid tracks owed to cyber recovery vault CRy 205 in reproduction volume R1 325 (Block 415), and when the initial synchronization process is complete, ODR CPA 180 switches to differential mode (normal operation) (Block 420).

During the initialization mode of operation, depending on the amount of data that is required to be transmitted from reproduction volume R1 325 to reproduction volume R2 330, it is possible that SVCMS 190 may create one or more additional snapsets 310 of $VDG_1$. For example, if SVCMS 190 is configured to create a snapset 310 of $VDG_1$ every 5 minutes, and it takes a 30 minutes to synchronize the first snapset 310 to reproduction volume R2 330, it would be expected that multiple additional snapsets 310 would be created by SVCMS 190 during the initialization period. These successive snapsets 310 will contain only differences between the earlier snapset 310, and hence would be expected to be much smaller in size than the original snapset 310. As shown in FIG. 4, in some embodiments ODR CPA 180 monitors for creation of additional snapsets 310 of $VDG_1$ (Block 425). If a snapset 310 is created by SVCMS 190 of $VDG_1$ (a determination of YES at Block 425) ODR CPA 180 links the snapset 310 to the reproduction volume R1 325 (Block 430). When the new snapset 310 is added to reproduction volume R1 325, the tracks of the new snapset 310 will also be synchronized to reproduction volume R2 330 on the reproduction data facility. ODR CPA 180 continues to monitor for creation of new snapsets 310 by SVCMS 190 until synchronization to reproduction volume R2 330 is complete (Block 415) and then switches to differential mode (Block 420).

Figure 5:
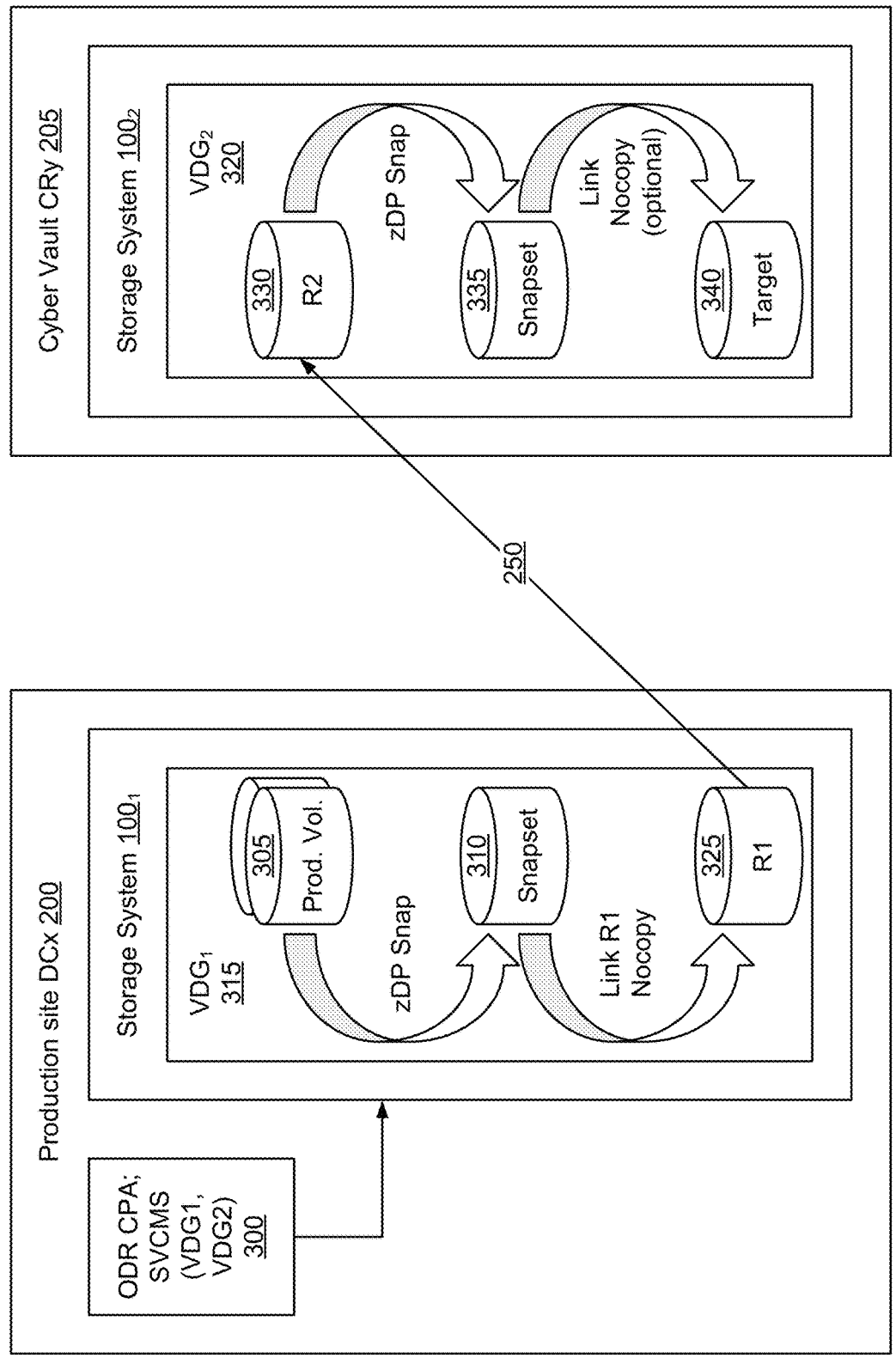
FIG. 5 is a functional block diagram showing differential mode of operation of the ODR CPA, when the ODR CPA is operating using type 1 operation, in which the ODR CPA action cycle is triggered by creation of production site DCx snapsets by SVCMS.
Figure 6:
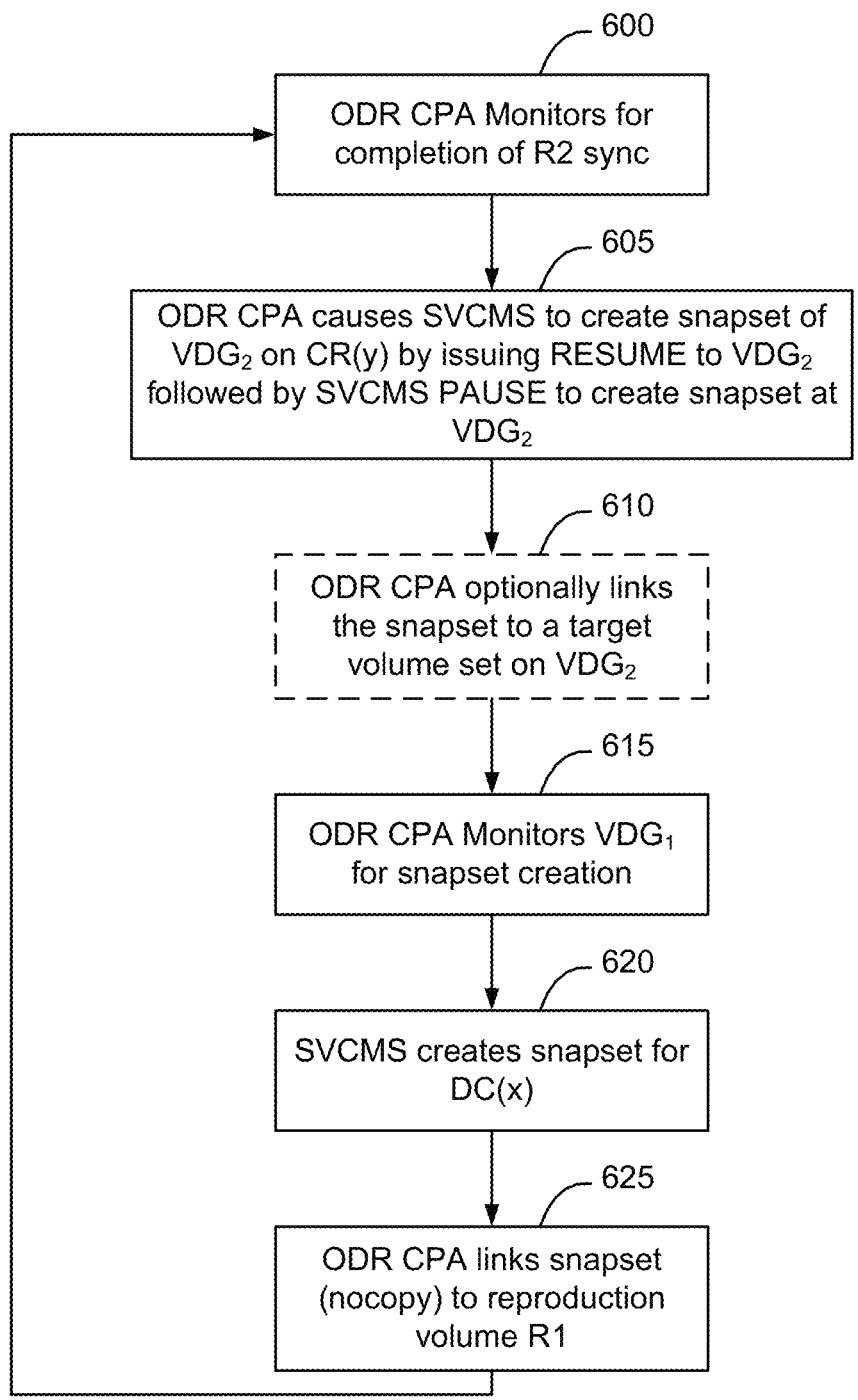
FIG. 6 is a flow chart corresponding to FIG. 5, and shows a method implemented by the ODR CPA during type 1 differential mode of operation.

FIG. 5 is a functional block diagram showing differential mode of operation of the ODR CPA 180, when the ODR CPA 180 is operating using type 1 operation, in which the ODR CPA 180 action cycle is triggered by creation of a production site DCx 200 snapset 310 autonomously by SVCMS 190. FIG. 6 is a corresponding flow chart of a method implemented by the ODR CPA 180 during differential operation mode (type 1).

As shown in FIGS. 5 and 6, during differential mode (type 1) ODR CPA 180 monitors for completion of synchronization of data from R1 volume 325 to reproduction volume R2 330 (Block 600). When synchronization to reproduction volume R2 330 is complete, as determined by the fact that there are no invalid tracks in reproduction volume R1 325 that are owed to cyber recovery vault CRy 205, ODR CPA 180 causes SVCMS 190 to create snapset 335 of $VDG_2$ on cyber recovery vault CRy 205 by issuing SVCMS 190 RESUME command to $VDG_2$ followed by SVCMS 190 PAUSE command. This combination of commands, in some embodiments, causes SVCMS 180 to create snapset 335 of $VDG_2$ (Block 605). ODR CPA 180 may optionally link the snapset 335 (nocopy) to a target set 340 on cyber recovery vault CRy 205 (Block 610).

ODR CPA 180 then monitors $VDG_1$ for snapshot creation by SVCMS 190 (Block 615). When SVCMS 190 autonomously creates a snapset 310 of $VDG_1$ on production site DCx 200 (Block 620) ODR CPA 180 links the snapset 310 (nocopy) to reproduction volume R1 325 (Block 625) and the process returns to Block 600, where ODR CPA 180 monitors for completion of synchronization to reproduction volume R2 330. In Type 1, when the ODR CPA 180 is operating in differential mode, the ODR CPA 180 action cycle is triggered by creation of a production site DCx 200 snapset 310 by SVCMS 190 in block 620. Implementation of the ODR CPA 180 action cycle causes a one-to-one creation of snapsets 310, 335 on both the production site DCx 200 $VDG_1$ and cyber recovery vault CRy 205 $VDG_2$.

Figure 7:
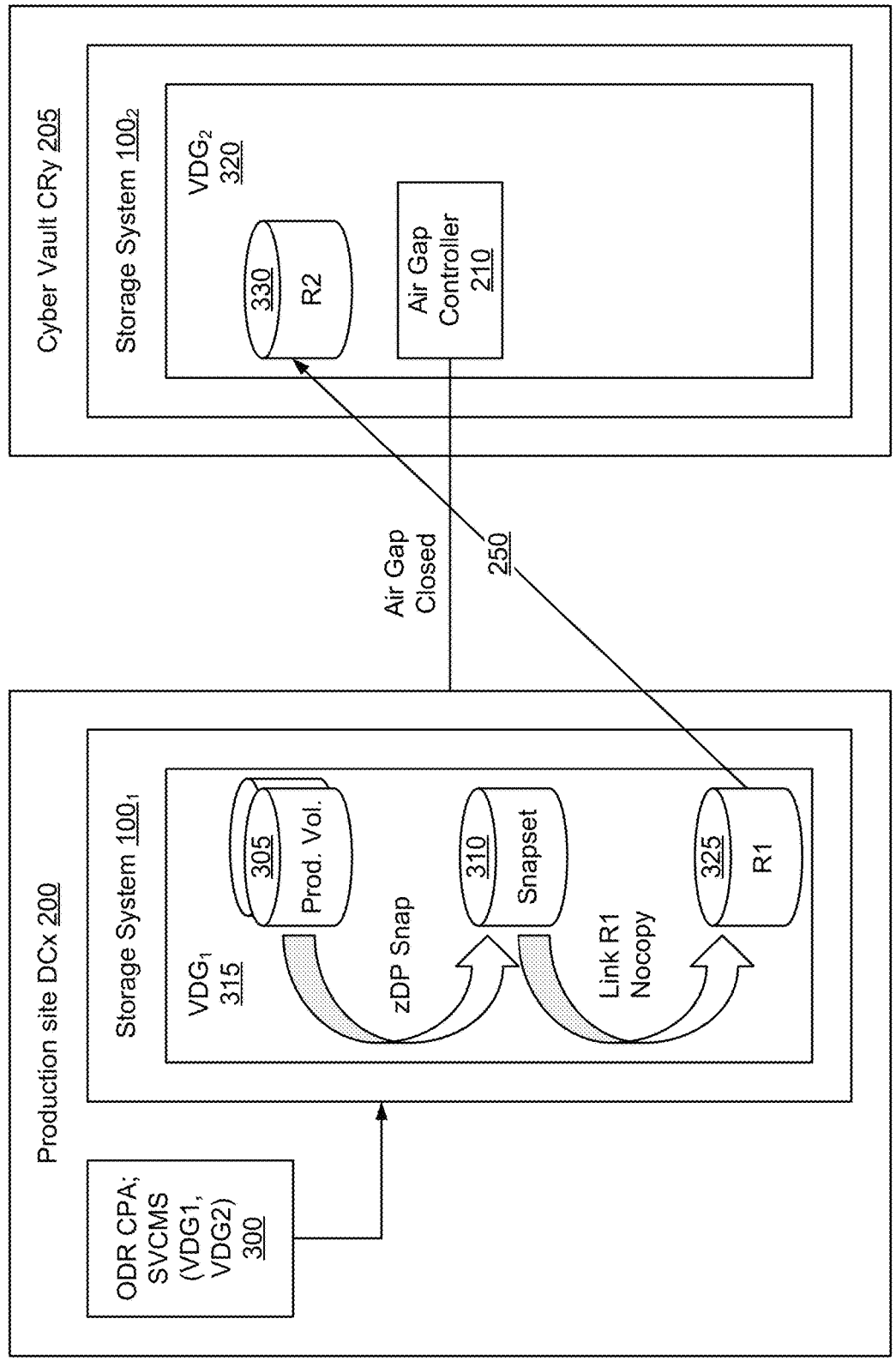
FIG. 7 is a functional block diagram showing initialization mode of operation of the ODR CPA, when the ODR CPA is operating using type 2 operation, in which the ODR CPA action cycle is triggered by closing of an air gap by an air gap controller on a cyber recovery vault CRy.
Figure 8:
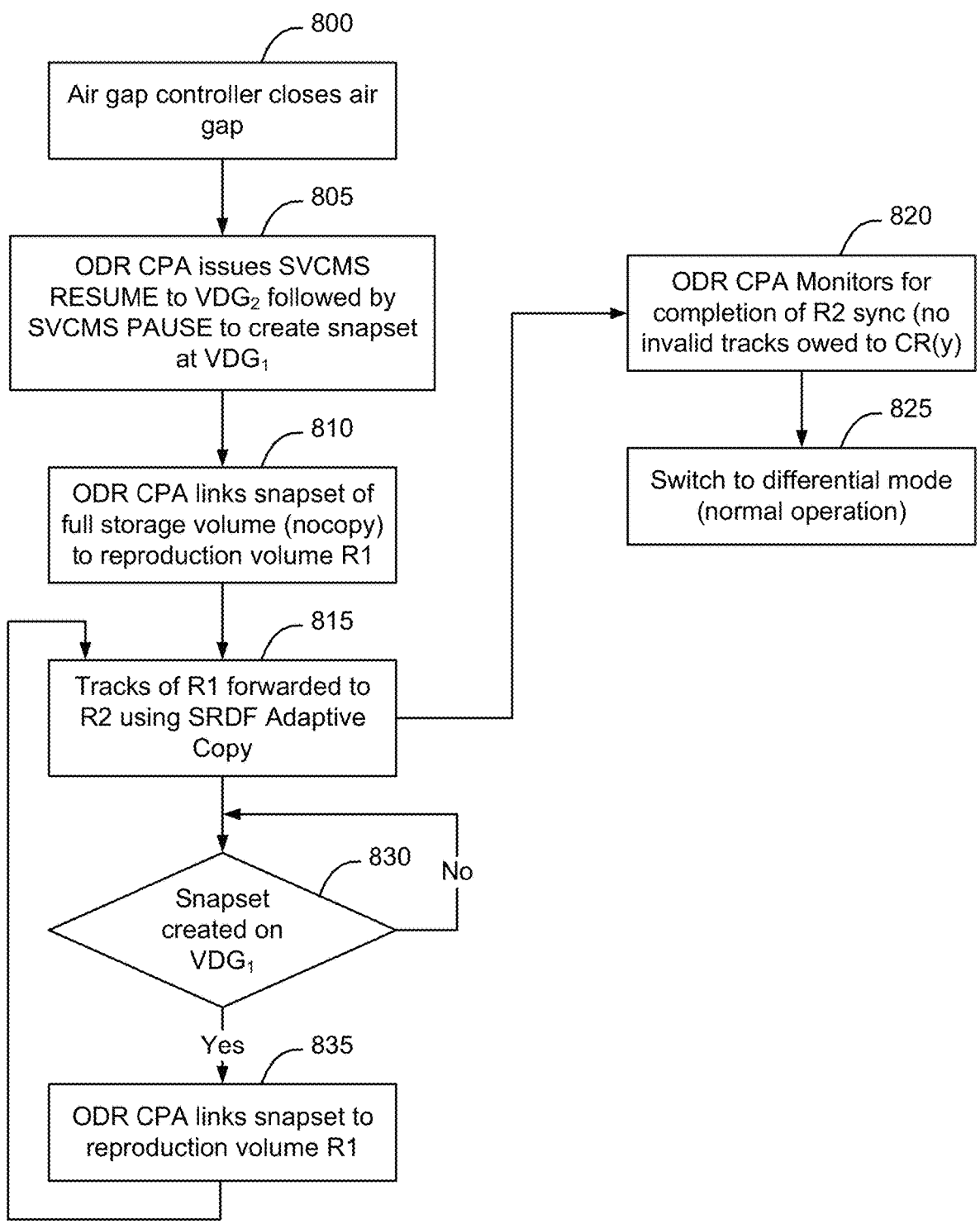
FIG. 8 is a flow chart corresponding to FIG. 7, and shows a method implemented by the ODR CPA during type 2 initialization mode of operation.

FIG. 7 is a functional block diagram showing initialization mode of operation of the ODR CPA 180, when the ODR CPA 180 is operating using type 2 operation, in which the ODR CPA 180 action cycle is triggered by closing of the air gap by an air gap controller 210 on cyber recovery vault CRy 205. In some embodiments, the air gap controller 210 is an air gap management server. FIG. 8 is a corresponding flow chart of a method implemented by the ODR CPA 180 during the initialization mode of operation.

In FIG. 7, ODR CPA 180 and SVCMS 190 are running on a server 300 connected to the storage system at the production site DCx 200. An air gap controller 210 has also been started at the cyber recovery vault CRy 205. Two SVCMS VDGs have been defined—a first SVCMS 190 $VDG_1$ at the production site DCx 200 and a second SVCMS 190 $VDG_2$ at the cyber recovery vault CRy 205. In some embodiments, the vault site $VDG_2$ START and PAUSE commands are issued prior to ODR CPA 180 initialization. Each VDG has its own MAX_SNAPSETS value. In type 2, creation of snapsets 310, 335 on both $VDG_1$ and $VDG_2$ are controlled by ODR CPA 180, and are implemented by ODR CPA 180 instructing SVCMS 190 to create corresponding snapsets 310, 335 of DCx $VDG_1$ and cyber recovery vault CRy 205 $VDG_2$ using SVCMS 190 PAUSE/RESUME instructions.

As shown in FIGS. 7 and 8, during the initialization mode of operation (Type 2), ODR CPA 180 monitors for the air gap to be closed. When the air gap controller 210 closes the air gap (Block 800) ODR CPA 180 issues a SVCMS 190 RESUME instruction followed by a SVCMS 190 PAUSE instruction to cause SVCMS 190 to creates a snapset 310 of $VDG_1$ on production site DCx 200 (Block 805). Since this is the first snapset 310, the snapset 310 will be a snapset 310 of the full volumes 305 contained in the $VDG_1$. In response to creation of the snapset 310 by SVCMS 190, ODR CPA 180 links the snapset 310 to reproduction volume R1 325 in nocopy mode (Block 810). Storage system 1 then transmits tracks of reproduction volume R1 325 to reproduction volume R2 330 using SRDF adaptive copy (Block 815). ODR CPA 180 monitors for completion of synchronization to reproduction volume R2 330, meaning that there are no invalid tracks owed to cyber recovery vault CRy 205 in reproduction volume R1 325 (Block 820), and when synchronization is complete, ODR CPA 180 switches to differential mode (normal operation) (Block 825).

During the initialization mode of operation, depending on the amount of data that is required to be transmitted from reproduction volume R1 325 to reproduction volume R2 330, it is possible that SVCMS 190 may create one or more additional snapsets 310 of $VDG_1$. For example, if ORD CPA 180 is configured to instruct SVCMS 190 to create a snapset 310 of $VDG_1$ every 5 minutes, and it takes a half hour to synchronize the first snapset 310 to reproduction volume R2 330, it would be expected that multiple additional snapsets 310 would be created by SVCMS 190 during the initialization period. These successive snapsets 310 will contain only differences between the earlier snapset 310, and hence would be expected to be much smaller in size than the original snapset 310. As shown in FIG. 8, in some embodiments ODR CPA 180 monitors for creation of additional snapsets 310 of $VDG_1$ (Block 830). If a snapset 310 is created by SVCMS 190 of $VDG_1$ (a determination of YES at Block 830) ODR CPA 180 links the snapset 310 to the reproduction volume R1 325 (Block 835). When the new snapset 310 is added to reproduction volume R1 325, the tracks of the new snapset 310 will also be synchronized to reproduction volume R2 330 on the reproduction data facility 335. ODR CPA 180 continues to monitor for creation of new snapsets 310 by SVCMS 190 until synchronization to reproduction volume R2 330 is complete (Block 820) and then switches to differential mode (Block 825).

Figure 9:
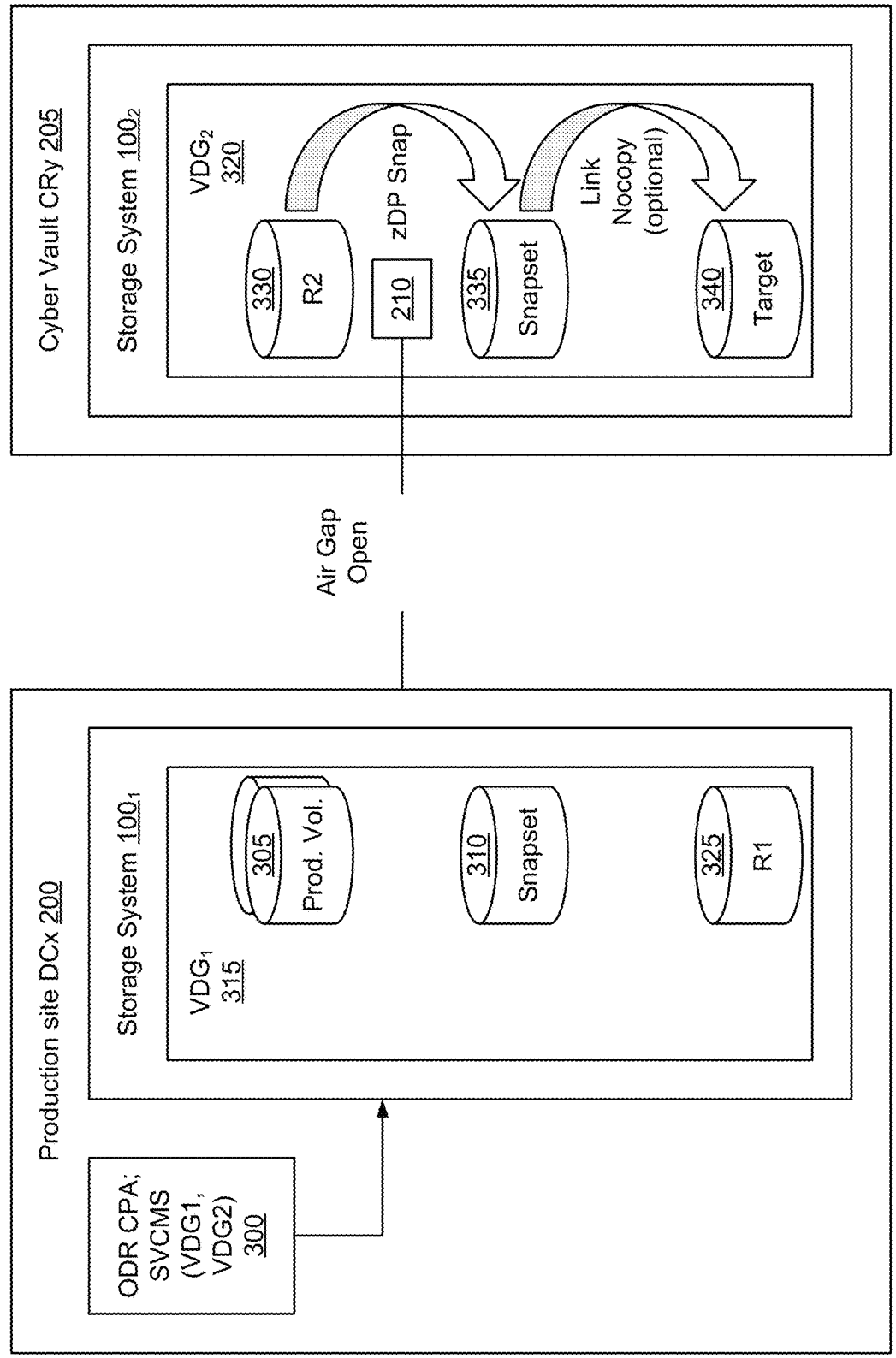
FIGS. 9 and 10 are functional block diagrams showing differential mode of operation of the ODR CPA, when the ODR CPA is operating using type 2 operation, in which the ODR CPA action cycle is triggered by closing of the air gap by air gap controller.
Figure 10:
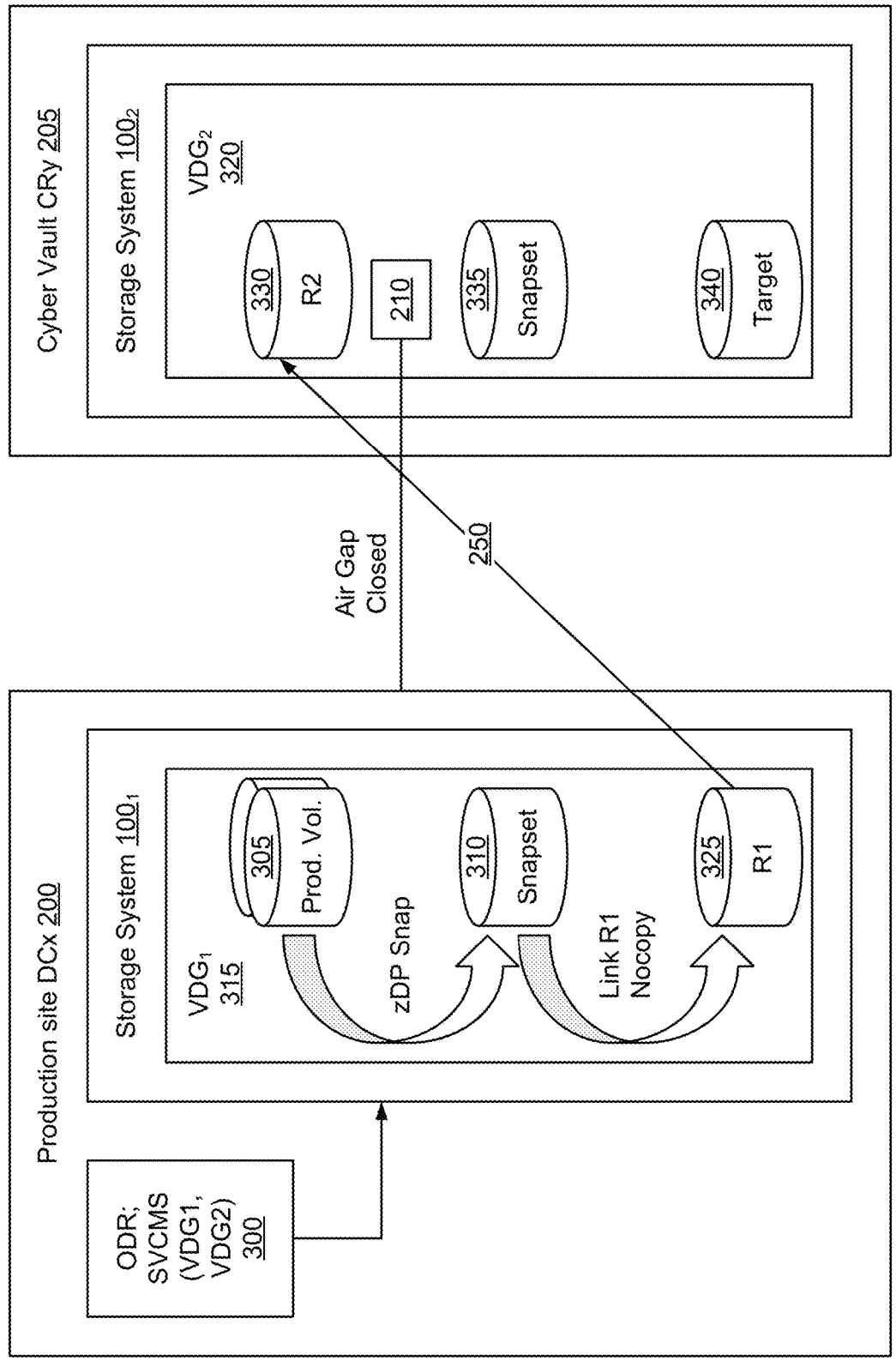
Figure 11:
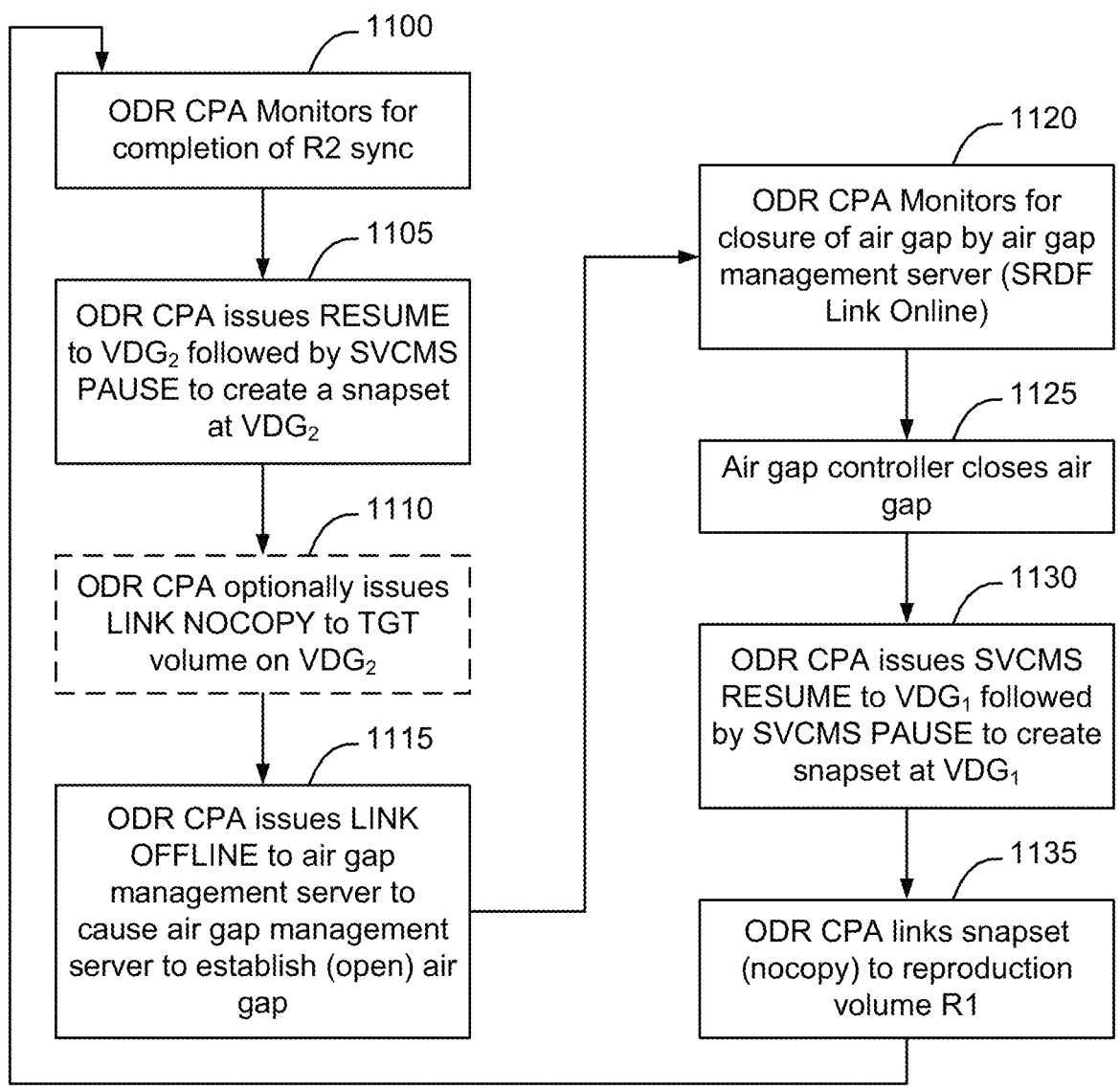
FIG. 11 is a flow chart corresponding to FIGS. 9 and 10, and shows of a method implemented by the ODR CPA during type 2 differential mode of operation.

FIGS. 9 and 10 are functional block diagrams showing differential mode of operation of the ODR CPA 180, when the ODR CPA 180 is operating using type 2 operation, in which the ODR CPA 180 action cycle is triggered by closing of the air gap by air gap controller 210. FIG. 11 is a corresponding flow chart of a method implemented by the ODR CPA 180 during differential mode of operation (Type 2). FIG. 9 shows the air gap closed, which happens at block 1125 of FIG. 11, and FIG. 10 shows the air gap open, which happens at block 1115 of FIG. 11.

As shown in FIGS. 9-11, during differential mode (Type 2) ODR CPA 180 monitors for completion of synchronization to reproduction volume R2 330 (Block 1100). When synchronization to reproduction volume R2 330 is complete, as determined by the fact that there are no invalid tracks in reproduction volume R1 325 that are owed to cyber recovery vault CRy 205, ODR CPA 180 causes SVCMS 190 to create snapset 335 of VDG2 on cyber recovery vault CRy 205 by issuing RESUME to VDG2 followed by SVCMS 190 PAUSE to create snapset 335 of $VDG_2$ (Block 1105). ODR CPA 180 may optionally link the snapset 335 (nocopy) to a target set 340 on cyber recovery vault CRy 205 (Block 1110)

ODR CPA 180 then issues a LINK OFFLINE command to the air gap controller 210 to cause the air gap controller 210 to establish (open) the air gap (Block 1115). In some embodiments, the air gap controller 210 implements this by disabling the RDF links 250. Once the RDF links 250 are disabled, the ODR CPA 180 cannot use the RDF links 250 to interact with the air gap controller 210 and, accordingly, the air gap controller 210 executes independent of the ODR CPA 180 once the air gap has been established.

The ODR CPA 180 then monitors for closure of the air gap by the air gap controller 210 (Block 1120). For example, the ODR CPA 180 may periodically poll the status of the RDF links 250 and, when the RDF link 250 status is "online" determine that the air gap has been closed. When the air gap controller 210 closes the air gap (Block 1125), ODR CPA 180 causes SVCMS 190 to create a snapset 310 of volumes 305 of $VDG_1$ on production site DCx 200 (block 1130). For example, ODR CPA 180 may issue a SVCMS 190 RESUME instruction followed by a SVCMS 190 PAUSE instruction to cause SVCMS 190 to creates a snapset 310 of $VDG_1$ on production site DCx 200 (Block 1130). ODR CPA 180 links the snapset 310 (nocopy) to the reproduction volume R1 325 (Block 1135) and the process returns to Block 1100, where ODR CPA 180 monitors for completion of synchronization to reproduction volume R2 330.

In Type 2, when the ODR CPA 180 is operating in differential mode, the ODR CPA 180 action cycle is triggered by closure of the air gap by the air gap controller 210 in block 1125. Implementation of the ODR CPA 180 action cycle causes a one-to-one creation of snapsets 310, 335 on both the production site DCx 200 $VDG_1$ and cyber recovery vault CRy 205 $VDG_2$.

Figure 12:
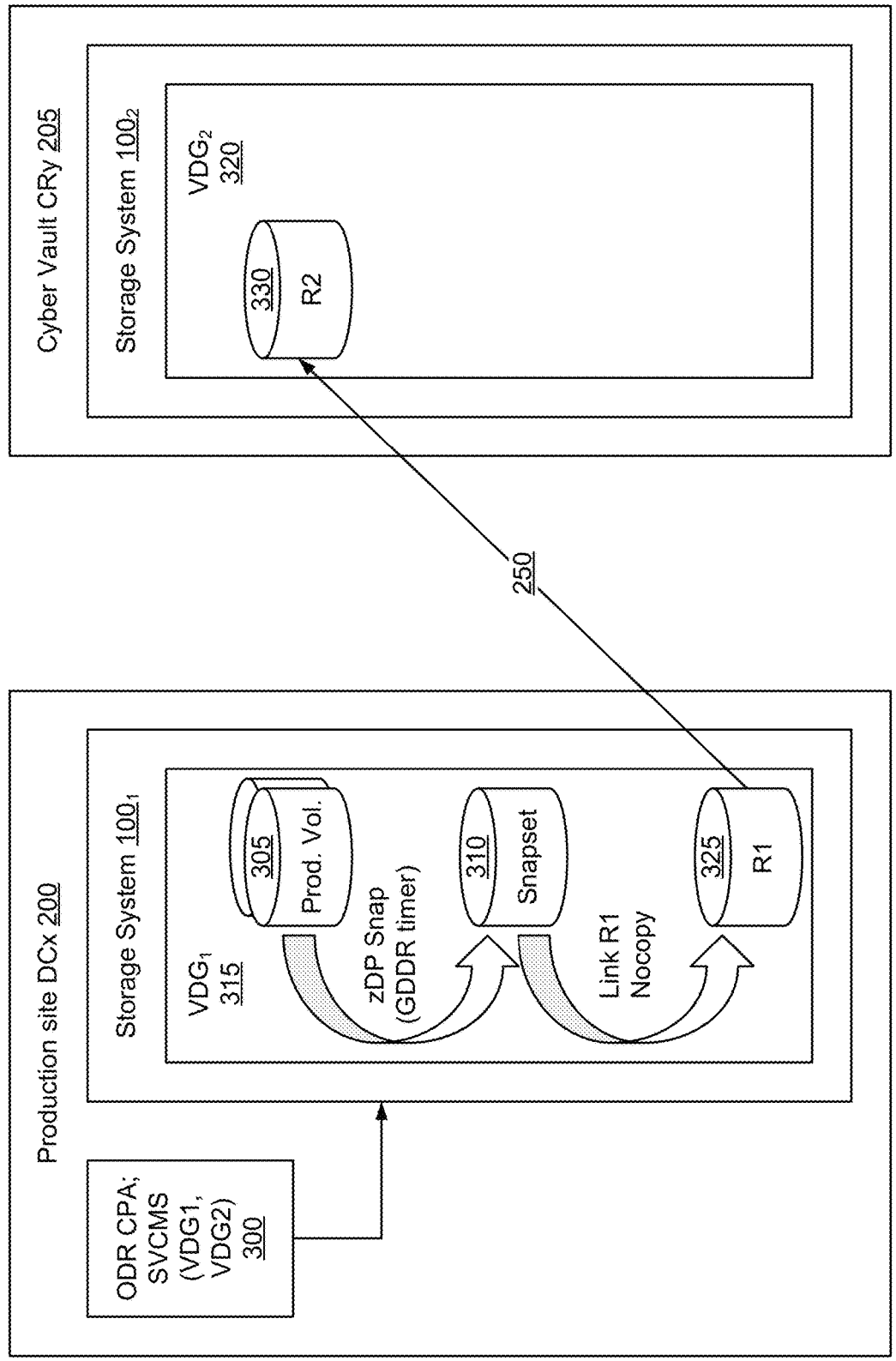
FIG. 12 is a functional block diagram showing initialization mode of operation of the ODR CPA, when the ODR CPA is operating using type 3 operation, in which the ODR CPA action cycle is triggered by a schedule or interval parameter, or another ODR trigger event, in the ODR system.
Figure 13:
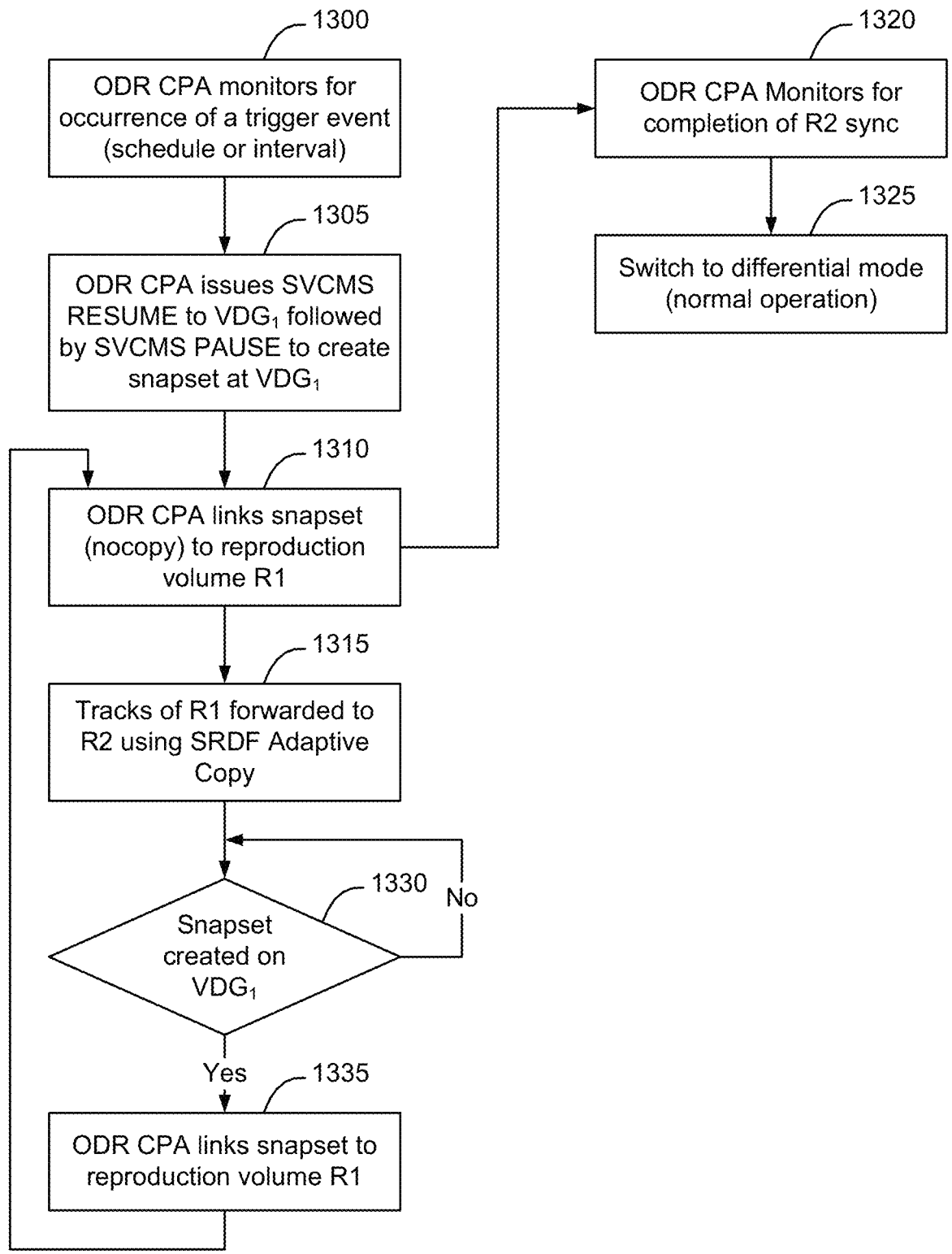
FIG. 13 is a flow chart corresponding to FIG. 12, and shows a method implemented by the ODR CPA during type 3 initialization mode of operation.

FIG. 12 is a functional block diagram showing initialization mode of operation of the ODR CPA 180, when the ODR CPA 180 is operating using type 3 operation, in which the ODR CPA 180 action cycle is triggered by a schedule or interval parameter, or other trigger event, in ODR CPA 180. An example other ODR CPA 180 trigger event might be receipt of an instruction to create a snapset 310, for example, from a user. FIG. 13 is a corresponding flow chart of a method implemented by the ODR CPA 180 during the initialization mode of operation.

In FIG. 12, ODR CPA 180 and SVCMS are running on a server 300 connected to the storage system at the production site DCx 200. Two SVCMS VDGs have been defined—a first SVCMS 190 $VDG_1$ at the production site DCx 200 and a second SVCMS 190 $VDG_2$ at the cyber recovery vault CRy 205. In some embodiments, the vault site $VDG_2$ START and PAUSE commands are issued prior to ODR CPA 180 initialization. Each VDG has its own MAX_SNAPSETS value. In type 3, creation of snapsets 310, 335 of both $VDG_1$ and $VDG_2$ are controlled by ODR CPA 180, and are implemented by ODR CPA 180 instructing SVCMS 190 to create corresponding snapsets 310, 335 of production site DCx 200 $VDG_1$ and cyber recovery vault CRy 205 $VDG_2$ using SVCMS 190 PAUSE/RESUME instructions.

As shown in FIGS. 12 and 13, during the initialization mode of operation (Type 3), ODR CPA 180 monitors for occurrence of a trigger event. An example trigger event may be the expiration of a timer or reaching a scheduled event. Other example triggers might include receiving a manual instruction from a user, or other types of events depending on the implementation. When the trigger event occurs (Block 1300) ODR CPA 180 issues a SVCMS 190 RESUME instruction followed by a SVCMS 190 PAUSE instruction to cause SVCMS 190 to creates a snapset 310 of volumes 305 of $VDG_1$ on production site DCx 200 (Block 1305). Since this is the first snapset 310, the snapset 310 will be a snapset 310 of the full volumes 305 contained in the $VDG_1$. In response to creation of the snapset 310 by SVCMS 190, ODR CPA 180 links the snapset 310 to reproduction volume R1 325 in nocopy mode (Block 1310). Storage system 1 then transmits tracks of reproduction volume R1 325 to reproduction volume R2 330 using SRDF adaptive copy (Block 1315). ODR CPA 180 monitors for completion of synchronization to reproduction volume R2 330, meaning that there are no invalid tracks owed to cyber recovery vault CRy 205 in reproduction volume R1 325 (Block 1320), and when synchronization is complete, ODR CPA 180 switches to differential mode (normal operation) (Block 1325).

During the initialization mode of operation, depending on the amount of data that is required to be transmitted from reproduction volume R1 325 to reproduction volume R2 330, it is possible that ODR CPA 180 may cause SVCMS 190 to create one or more additional snapsets 310 of $VDG_1$. For example, if the ODR CPA 180 is configured such that the snapshot 310 interval timer is five minutes, the ODR CPA 180 will cause SVCMS 190 to create a snapset 310 of $VDG_1$ every 5 minutes. If it takes a half hour to synchronize the first snapset 310 to reproduction volume R2 330, it would be expected that multiple additional snapsets 310 would be created by SVCMS 190 during the initialization period. These successive snapsets 310 will contain only differences between the earlier snapset 310, and hence would be expected to be much smaller in size than the original snapset 310. As shown in FIG. 13, in some embodiments ODR CPA 180 monitors for creation of additional snapsets 310 of $VDG_1$ (Block 1330). If a snapset 310 is created by SVCMS 190 of $VDG_1$ (a determination of YES at Block 1330) ODR CPA 180 links the snapset 310 to the reproduction volume R1 325 (Block 1335). When the new snapset 310 is added to reproduction volume R1 325, the tracks of the new snapset 310 will also be synchronized to reproduction volume R2 330 on the reproduction data facility. ODR CPA 180 continues to monitor for creation of new snapsets 310 by SVCMS 190 until synchronization to reproduction volume R2 330 is complete (Block 1320) and then switches to differential mode (Block 1325).

Figure 14:
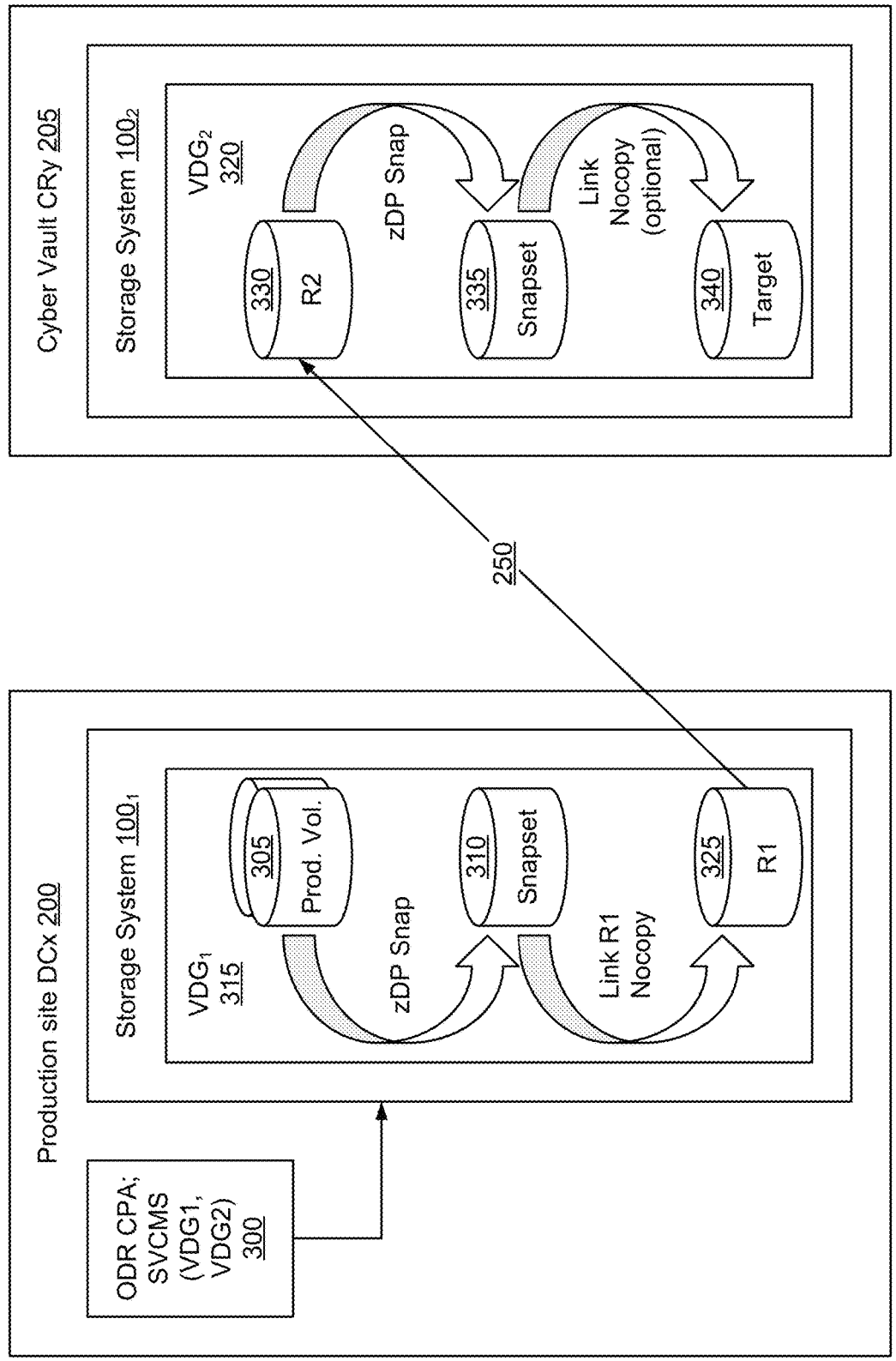
FIG. 14 is a functional block diagram showing differential mode of operation of the ODR CPA, when the ODR CPA is operating using type 3 operation, in which the ODR CPA action cycle is triggered by a schedule or interval parameter, or another ODR trigger event, in the ODR system.
Figure 15:
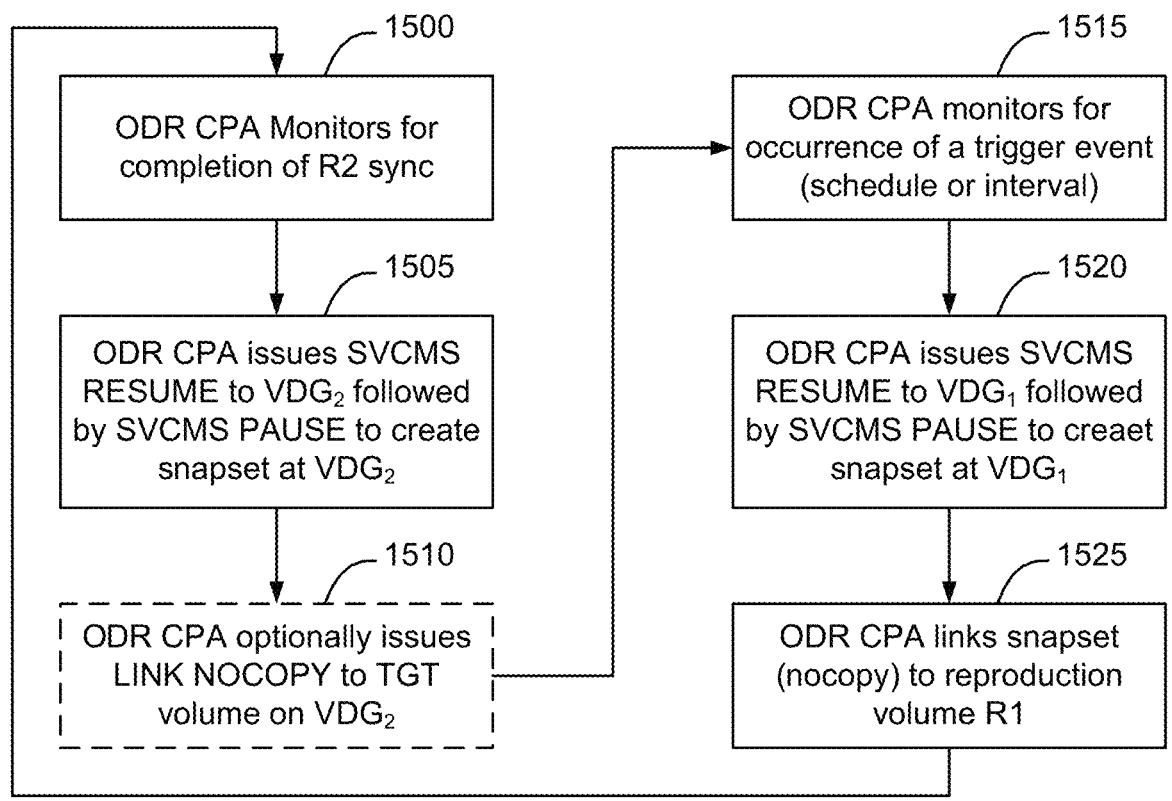
FIG. 15 is a flow chart corresponding to FIG. 15, and shows a method implemented by the ODR CPA during type 3 differential mode of operation.

FIG. 14 is a functional block diagram showing differential mode of operation of the ODR CPA 180, when the ODR CPA 180 is operating using type 3 operation, in which the ODR CPA 180 action cycle is triggered by a ODR CPA 180 trigger event. FIG. 15 is a corresponding flow chart of a method implemented by the ODR CPA 180 during differential mode of operation.

As shown in FIGS. 14-15, during differential mode (Type 3) ODR CPA 180 monitors for completion of synchronization to reproduction volume R2 330 (Block 1500). When synchronization to reproduction volume R2 330 is complete, as determined by the fact that there are no invalid tracks in reproduction volume R1 325 that are owed to cyber recovery vault CRy 205, ODR CPA 180 causes SVCMS 190 to create snapset 335 of $VDG_2$ on cyber recovery vault CRy 205 by issuing RESUME to $VDG_2$ followed by SVCMS 190 PAUSE to create snapset of $VDG_2$ (Block 1505). ODR CPA 180 may optionally link the snapset 335 (nocopy) to a target set 340 on cyber recovery vault CRy 205 (Block 1510)

The ODR CPA 180 then monitors for occurrence of a ODR CPA 180 trigger event (Block 1515). For example, the ODR CPA 180 may be configured to initiate a ODR CPA 180 cycle according to a particular schedule, or upon expiration of an interval timer. An example schedule might be to cause the ODR CPA 180 to execute the PDR CPA 180 protection cycle a snapshot every 5 minutes during business hours, and to create a snapshot every 60 minutes outside of business hours. An example interval timer might be used, for example, to cause the ODR CPA 180 to execute the PDR CPA 180 protection cycle every 15 minutes. The particular set of ODR CPA triggers that are used to cause the ODR CPA 180 to execute the PDR CPA 180 protection cycle will depend on the particular implementation.

When the ODR CPA 180 determines that a ODR CPA 180 trigger event has occurred (Block 1515), ODR CPA 180 causes SVCMS 190 to create a snapset 310 of $VDG_1$ on production site DCx 200 (block 1520). For example, ODR CPA 180 may issue a SVCMS 190 RESUME instruction followed by a SVCMS 190 PAUSE instruction to cause SVCMS to creates a snapset 310 of $VDG_1$ on production site DCx 200 (Block 1520). ODR CPA 180 links the snapset 310 (nocopy) to a reproduction volume R1 325 (Block 1525) and the process returns to Block 1500, where ODR CPA 180 monitors for completion of synchronization to reproduction volume R2 330.

In Type 3, when the ODR CPA 180 is operating in differential mode, the ODR CPA 180 action cycle is triggered by occurrence of a trigger event in ODR CPA 180 in block 1515. Implementation of the ODR CPA 180 action cycle, when operating in differential mode, causes a one-to-one creation of snapsets 310, 335 of both the production site DCx 200 $VDG_1$ and cyber recovery vault CRy 205 $VDG_2$.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of automated orchestration of cyber protection for a set of storage volumes, comprising:
    defining a first Versioned Data Group (VDG) containing the set of storage volumes on a production site by a Storage Volume Creation and Management System (SVCMS);
    defining a second VDG on a cyber vault by the SVCMS; and
    creating a first snapset of the set of storage volumes of the first VDG the first snapset being a point in time copy of the storage volumes or changes to the storage volumes since creation of a previous snapset;
    adding the first snapset of the set of storage volumes to a first reproduction volume in the first VDG at the production site by an Orchestrated Disaster Recovery (ODR) Cyber Protection Automation (CPA) application, the first reproduction volume being configured to synchronize the first snapset of the set of storage volumes contained in the first reproduction volume to a second reproduction volume in the second VDG at the cyber vault to create a point-in-time copy of the storage volumes in the second VDG at the cyber vault;
    monitoring synchronization of the first snapset of the set of storage volumes by the ODR CPA application from the first reproduction volume to the second reproduction volume;
    upon completion of synchronization of the first snapset of the set of storage volumes from the first reproduction volume to the second reproduction volume, instructing the SVCMS, by the ODR CPA application, to create a second snapset of the point-in-time copy of the storage volumes at the cyber vault and add the second snapset to the second VDG at the cyber vault.

2. The method of claim 1, further comprising iterating the steps of creating the first snapset, adding the first snapset to the reproduction volume in the first VDG, monitoring synchronization of the first snapset to the second reproduction volume, and instructing the SVCMS to create a second snapset of the second VDG.

3. The method of claim 2, wherein the step of creating the first snapset of the set of storage volumes of the first VDG occurs autonomously by the SVCMS, and wherein the steps of adding the first snapset to the reproduction volume in the first VDG, monitoring synchronization of the first snapset to the second reproduction volume, and instructing the SVCMS to create a second snapset of the second VDG is implemented by the ODR CPA application in response to autonomous creation of the first snapset of the set of storage volumes of the first VDG.

4. The method of claim 1, further comprising creating an air gap between the production site and cyber vault after instructing the SVCMS, by the ODR CPA application, to create the second snapset, the air gap preventing communication between the production site and cyber vault.

5. The method of claim 4, wherein creating an air gap comprises instructing the cyber vault, by the ODR CPA application, to disable one or more ports connecting to communication links connecting the production site and cyber vault.

6. The method of claim 4, further comprising closing the air gap by the cyber vault to enable communication between the production site and cyber vault.

7. The method of claim 6, further comprising:
detecting, by the ODR CPA application that the air gap has been closed; and
in response to detecting by the ODR CPA application that the air gap has been closed instructing the SVCMS, by the ODR CPA, to create the first snapset of the set of storage volumes of the first VDG.

8. The method of claim 7, further comprising iterating, by the ODR CPA, the steps of detecting that the air gap has been closed, instructing the SVCMS to create the first snapset, adding the first snapset to the reproduction volume in the first VDG, monitoring synchronization of the first snapset to the second reproduction volume, instructing the SVCMS to create a second snapset of the second VDG, and instructing the cyber vault to open the air gap.

9. The method of claim 1, wherein the step of creating the first snapset of the set of storage volumes of the first VDG comprises:
detecting occurrence of a trigger event by the ODR CPA; and
in response to detecting occurrence of the trigger event by the ODR CPA, instructing the SVCMS, by the ODR CPA, to create the first snapset of the set of storage volumes of the first VDG.

10. The method of claim 1, further comprising mounting the second snapset to a target set of devices at the cyber vault.

11. The method of claim 1, further comprising:
creating a third snapset of the set of storage volumes of the first VDG prior to completion of synchronization of the first snapset from the first reproduction volume to the second reproduction volume, the third snapset being a point in time copy changes to the storage volumes since creation of a first snapset;
adding the third snapset to the first reproduction volume;
synchronizing the third snapset from the first reproduction volume to the second reproduction volume;
monitoring synchronization of the third snapset of the set of storage volumes by the ODR CPA application from the first reproduction volume to the second reproduction volume; and
wherein the step of instructing the SVCMS, by the ODR CPA application, to create a second snapset of the point-in-time copy of the storage volumes at the cyber vault and add the second snapset to the second VDG at the cyber vault does not occur until after completion of synchronization of both the first snapset and the third snapset from the first reproduction volume to the second reproduction volume.

* * * * *